(12) United States Patent
Carter et al.

(10) Patent No.: US 6,612,911 B2
(45) Date of Patent: Sep. 2, 2003

(54) ALKALI METAL-CONTAINING POLISHING SYSTEM AND METHOD

(75) Inventors: Phillip Carter, Naperville, IL (US); Gregory H. Bogush, Aurora, IL (US); Francesco M. De Rege, Naperville, IL (US); Jeffrey P. Chamberlain, Aurora, IL (US); David J. Schroeder, Aurora, IL (US); Brian L. Mueller, Middleton, DE (US)

(73) Assignee: Cabot Microelectronics Corporation, Aurora, IL (US)

( * ) Notice: Subject to any disclaimer, the term of this patent is extended or adjusted under 35 U.S.C. 154(b) by 0 days.

(21) Appl. No.: 10/044,174

(22) Filed: Jan. 11, 2002

(65) Prior Publication Data

US 2003/0082998 A1 May 1, 2003

Related U.S. Application Data

(60) Provisional application No. 60/261,926, filed on Jan. 16, 2001.

(51) Int. Cl.$^7$ ................................................ B24B 19/00
(52) U.S. Cl. ........................ 451/41; 451/36; 451/287; 51/295; 51/308
(58) Field of Search ................................ 451/41, 36, 63, 451/285, 287, 288; 438/693, 692; 51/308, 295; 156/345.11, 345.12

(56) References Cited

U.S. PATENT DOCUMENTS

| | | | |
|---|---|---|---|
| 4,169,337 A | 10/1979 | Payne | |
| 4,462,188 A | 7/1984 | Payne | |
| 4,752,628 A | 6/1988 | Payne | |
| 4,867,757 A | 9/1989 | Payne | |
| 4,892,612 A | 1/1990 | Huff | |
| 5,073,591 A * | 12/1991 | Tsaur | 524/460 |
| 5,176,752 A | 1/1993 | Scheiner | |
| 5,230,833 A | 7/1993 | Romberger et al. | |
| 5,376,222 A | 12/1994 | Miyajima et al. | |
| 5,407,526 A | 4/1995 | Danielson et al. | |
| 5,769,689 A * | 6/1998 | Cossaboon et al. | 451/41 |
| 5,860,848 A | 1/1999 | Loncki et al. | |
| 5,885,334 A | 3/1999 | Suzuki et al. | |
| 5,904,159 A | 5/1999 | Kato et al. | |
| 5,938,505 A * | 8/1999 | Morrison et al. | 451/36 |
| 6,027,669 A | 2/2000 | Miura et al. | |
| 6,267,909 B1 * | 7/2001 | Currie et al. | 252/79.1 |
| 6,322,600 B1 * | 11/2001 | Brewer et al. | 51/308 |
| 6,354,913 B1 * | 3/2002 | Miyashita et al. | 451/41 |

FOREIGN PATENT DOCUMENTS

| | | |
|---|---|---|
| WO | WO 99/62628 A1 | 12/1999 |
| WO | WO 00/00560 A2 | 1/2000 |
| WO | WO 00/36037 A2 | 6/2000 |
| WO | WO 01/78116 | 10/2001 |

OTHER PUBLICATIONS

Brunauer et al., The Journal of the American Chemical Society, pp. 309–319 (Jan.–Jun. 1938).
H SU et al., Journal; of Colloid and Interface Science, vol. 185, pp. 530–537 (1997).
Dialog File 351: Derwent WPI, Accession No. 002011834, Patent No. SU 516728, Jun. 23, 1977.
Dialog File 351: Derwent WPI, Accession No. 002229992, Patent No. SU 608823, May 16, 1978.

* cited by examiner

Primary Examiner—Eileen P. Morgan

(57) ABSTRACT

The invention provides a polishing system comprising (a) a liquid carrier, (b) an alkali metal ion, (c) a compound comprising an amine group and at least one polar moiety, wherein the polar moiety contains at least one oxygen atom, and (d) a polishing pad and/or an abrasive, wherein the total ion concentration of the system is above the critical coagulation concentration. The invention also provides a method of planarizing or polishing a composite substrate comprising contacting the substrate with a the aforementioned polishing system or a polishing system comprising (a) a liquid carrier, (b) an alkali metal ion, (c) a compound comprising an amine group and at least one polar moiety, wherein the polar moiety contains at least one oxygen atom, and (d) a polishing pad and/or an abrasive, and polishing at least a portion of the substrate therewith in about 6 hours or less after the polishing system is prepared.

48 Claims, No Drawings

ALKALI METAL-CONTAINING POLISHING SYSTEM AND METHOD

CROSS-REFERENCE TO RELATED PATENT APPLICATIONS

This patent application claims priority to provisional U.S. patent application No. 60/261,926, filed on Jan. 16, 2001.

TECHNICAL FIELD OF THE INVENTION

This invention pertains to polishing systems and methods for polishing substrates.

BACKGROUND OF THE INVENTION

The trend in the semiconductor industry continues to concentrate on reducing the size of semiconductor devices while improving the planarity of their surfaces. More specifically, it is desirable to achieve a surface of even topography by decreasing the number and allowable size of surface imperfections. A smooth topography is sought-after because it is difficult to lithographically image and pattern layers applied to rough surfaces. A conventional way of planarizing the surfaces of these devices is to polish them with a polishing system.

During polishing, it is often useful to polish one wafer surface material faster than another. For example, in shallow-trench isolation (STI), it is important to polish away an overlayer of silicon dioxide, until a silicon nitride layer is exposed, and then to remove as little of the exposed silicon nitride layer as possible. This can be accomplished by a polishing system that polishes away silicon dioxide at a faster rate than silicon nitride. The difference in the rate of polishing between two materials, such as silicon dioxide and silicon nitride, is called selectivity. Increased silicon dioxide-silicon nitride selectivity is a highly desirable property in STI polishing systems.

An accepted method of polishing (e.g., planarizing) semiconductor devices involves polishing the surface of the semiconductor with a polishing composition and/or a polishing pad, such as is accomplished by chemical-mechanical polishing (CMP). In a typical CMP process, a wafer is pressed against a polishing pad in the presence of a slurry under controlled chemical, pressure, velocity, and temperature conditions. The slurry generally contains small, abrasive particles that abrade the surface of the wafer in a mixture with chemicals that etch and/or oxidize the newly formed surface of the wafer. The polishing pad generally is a planar pad made from a continuous phase matrix material such as polyurethane. Thus, when the polishing pad and/or the wafer moves with respect to the other, material is removed from the surface of the wafer mechanically by the abrasive particles and chemically by the etchants and/or oxidants in the slurry.

While the aqueous chemicals desirably react chemically with the substrate, they also are reactive with the abrasive particles. This reaction can "soften" the abrasive particle surfaces, rendering the abrasive less abrasive. Moreover, the reaction of the chemical component with the abrasive particle surface lowers the concentration of that component available for reaction with the substrate surface during polishing. As a result, the polishing performance of premixed CMP slurries may not be optimal for the polishing of solid surfaces, including IC wafer surfaces, rigid disk surfaces, glass surfaces, magnetic media, etc. Furthermore, because CMP slurries must be stable for the extended periods over which they are typically stored before use, the chemical additives available for use in slurries is limited by their reactivity with other components in the slurry. This consideration also limits the concentration of additives that can be incorporated into slurries.

Thus, there remains a need for improved polishing systems and methods. The invention provides such a polishing system and method These and other advantages of the invention, as well as additional inventive features, will be apparent from the description of the invention provided herein.

BRIEF SUMMARY OF THE INVENTION

The invention provides polishing systems that comprise a liquid carrier, an alkali metal ion, a compound comprising an amine group and at least one polar moiety, wherein the polar moiety contains at least one oxygen atom (hereinafter referred to as an "amine-containing, compound"), and a polishing pad and/or an abrasive. The abrasive can be dispersed in the liquid carrier of the polishing system or bound to the polishing pad. In a first embodiment, the alkali metal ion and the amine-containing compound desirably are present in a concentration such that the total ion concentration of the polishing system is above the critical coagulation concentration. In a second embodiment, the polishing system comprises about 0.05 wt. % to about 0.15 wt. % KOH and about 0.4 M to about 0.8 M of the amine-containing compound. The invention further provides polishing a portion of a substrate with a polishing system of the invention, preferably beginning about 6 hours or less after the polishing system is prepared.

DETAILED DESCRIPTION OF THE INVENTION

The invention provides polishing systems and methods for polishing a substrate. Generally, the polishing systems comprise, consist essentially of, or consist of (a) a liquid carrier, (b) an alkali metal ion, (c) a compound comprising an amine group and at least one polar moiety, wherein the polar moiety contains at least one oxygen atom, and (d) a polishing pad and/or an abrasive. In a first embodiment, the polishing system has a total ion concentration, which is above the critical coagulation concentration. In a second embodiment, the polishing system comprises about 0.05 wt. % to about 0. 5 wt. % KOH and about 0.4 M to about 0.8 M of the compound comprising an amine group and at least one polar moiety, wherein the polar moiety contains at least one oxygen atom. The polishing methods generally comprise contacting a surface of a substrate with a polishing system and polishing at least a portion of the substrate. In a first embodiment, the polishing system used in the polishing method is one of the aforementioned polishing systems. In a second embodiment, the polishing system used in the polishing method comprises (a) a liquid carrier, (b) an alkali metal ion, (c) a compound comprising an amine group and at least one polar moiety, wherein the polar moiety contains at least one oxygen atom, and (d) a polishing pad and/or an abrasive, and a portion of the substrate is polished with the polishing system before the polishing system components reach a chemical equilibrium after the system is prepared.

Typically, each polishing system is used about 6 hours or less after the polishing system is prepared, which generally will be before the polishing system reaches a chemical equilibrium. Preferably, the polishing system is used about 4 hours or less (e.g., about 2 hours or less, about 1 hour or less, about 30 minutes or less, about 10 minutes or less, about 5 minutes or less, or even about 1 minute or less) after the polishing system is prepared. Indeed, the polishing system can be used seconds (e.g., about 30 seconds, or less or about 10 seconds or less) after the polishing system is prepared, such as when the polishing system components are mixed very near or at the point-of-use of the polishing system (e.g., on the polishing pad and/or substrate being polished).

The term "component" as used herein includes individual ingredients (e.g., acids, bases, oxidizers, water, etc.) as well as any combination of ingredients (e.g., aqueous compositions, abrasive slurries, mixtures and solutions of oxidizers, acids, bases, complexing agents, etc.) that are stored separately and combined to form a polishing system.

The polishing systems and methods of the invention can be used to polish any suitable substrate. Suitable substrates are typically wafers used in the semiconductor industry that are in need of polishing or planarizing. They comprise, for example, a metal, metal oxide, metal composite, metal alloy, or mixtures thereof. The substrate can comprise metals such as copper, aluminum, titanium, tungsten, gold, and combinations (e.g., alloys or mixtures) thereof. The substrate also can comprise metal oxides such as, alumina, silica, titania, ceria, zirconia, germania, magnesia, and co-formed products thereof, and mixtures thereof. In addition, the substrate can comprise metal composites and/or alloys such as metal nitrides (e.g., silicon nitride, tantalum nitride, titanium nitride, and tungsten nitride), metal carbides (e.g., silicon carbide and tungsten carbide), nickel-phosphorus, aluminoborosilicate, borosilicate glass, phosphosilicate glass (PSG), borophosphosilicate glass (BPSG), silicon-germanium alloys, and silicon-germanium-carbon alloys. The substrate also can comprise semiconductor base materials such as single-crystal silicon, poly-crystalline silicon, amorphous silicon, silicon-on-insulator, and gallium arsenide. The polishing systems and methods of the invention are not limited to semiconductor polishing, they also can be applied to glass substrates, including technical glass, optical glass, and ceramics, of various types known in the art.

The polishing systems and methods of the invention can be used to polish any part of a substrate (e.g., a semiconductor device) at any stage in the production of the substrate. For example, a particularly effective use of the polishing systems and methods of the invention is in polishing a semiconductor device in conjunction with shallow trench isolation (STI) processing or in conjunction with the formation of an interlayer dielectric (ILD) as is known in art.

The polishing systems described herein comprise an abrasive, a polishing pad, or both. Preferably, the polishing systems comprise both an abrasive and a polishing pad. The abrasive can be fixed on the polishing pad and/or can be in particulate form and suspended in the liquid carrier. The polishing pad can be any suitable polishing pad. The liquid carrier and substances dissolved or suspended (e.g., dispersed) therein, such as the alkali metal ion, the compound comprising an amine group and at least one polar moiety, wherein the polar moiety contains at least one oxygen atom, and the abrasive (when present and suspended in the liquid carrier), form the polishing composition, upon which all concentrations (e.g., weight percentage and molarity values) are based as recited therein. Thus, the concentrations recited herein are not based upon substances not dissolved or suspended in the liquid carrier (such as the polishing pad and any abrasive embedded therein).

Any suitable abrasive can be used in conjunction with the inventive polishing systems. Suitable abrasives are capable of polishing a substrate surface without introducing deleterious scratches or other imperfections in the substrate surface. The abrasive preferably is a metal oxide. Suitable metal oxide abrasives include, for example, alumina, silica, titania, ceria, zirconia, and magnesia, as well as co-formed products thereof, mixtures thereof, and chemical admixtures thereof. Silica is the preferred abrasive, with fumed silica being more preferred.

The abrasive can have any suitable abrasive particle characteristics depending on the desired polishing effects. In particular, the abrasive can have any suitable surface area. A suitable abrasive surface area, for example, is a surface area ranging from about 5 $m^2/g$ to about 430 $m^2/g$ (e.g., about 5–200 $m^2/g$), as calculated from the method of S. Brunauer, P. H. Emmet, and I. Teller, *J. Am. Chem. Soc.*, 60, 309 (1938). Desirably, the surface area of the abrasive used in conjunction with the invention is about 90 $m^2/g$ or more.

The abrasive can be combined with (e.g., suspended in) any suitable liquid carrier to form a dispersion or suspension (i.e., a "slurry"). Suitable liquid carriers generally include polar solvents, preferably water or an aqueous solvent. Where the abrasive is included in a dispersion, the dispersion can have any concentration of abrasive that is suitable for polishing. Generally, about 0.1 wt. % silica or more is contemplated. Desirably the polishing system will have 5–30 wt. % silica. Polishing systems containing 10–25 wt. % silica are preferred.

Alternatively, the abrasive in the polishing systems can be fixed (e.g., embedded) in or on a polishing pad. The aforementioned considerations as to the type of abrasive particle suitable for dispersions are applicable to embedded abrasives. Any suitable amount of abrasive can be embedded in the pad. A suitable amount is any amount sufficient to provide for polishing of a substrate surface at a suitable rate without introducing deleterious scratches or other imperfections in the substrate surface.

The alkali metal ion present in the polishing systems can be any suitable alkali metal ion. Suitable alkali metal ions include any of the univalent basic metals of group I of the periodic table. For example, sodium, potassium, rubidium, and cesium ions can be used. Potassium and cesium ions are preferred, with potassium ions being more preferred. Any suitable source of alkali metal ion can be used. For example, alkali metal salts or alkali metal hydroxides (e.g., KCI or KOH) are suitable sources of alkali metal ions.

The alkali metal ion can be present in the polishing systems in any suitable concentration, desirably such that the total ion concentration of the polishing system is above the critical coagulation concentration. Preferably, the alkali metal ion is present in the polishing system in a concentration of about 0.15 M or more (e.g., about 0.2 M or more). More preferably, the alkali metal ion is present in the polishing system in a concentration of 0.25 M or more, about 0.3 M or more, about 0.35 M or more, about 0.4 M or more, or even about 0.45 M or more. Generally, the alkali metal ion is present in the polishing system in an amount that does not exceed 1.5 M, preferably an amount that does not exceed 0.75 M (e.g., about 0. 15–0.75 M, or more preferably, about 0.2 M–0.5 M).

The amine-containing compound, which, as previously described, is a compound comprising an amine group and at least one polar moiety, wherein the polar moiety contains at least one oxygen atom (e.g., amino acids, amino alcohols, and the like) can be any suitable such compound in the polishing systems of the invention. Suitable amine-containing compounds include dimethylpropanolamine (also know as 2-dimethylamino-2-methyl-1-propanol or DMAMP), 2-amino-2-methyl-1-propanol (AMP), 2-(2-aminoethylamino)ethanol, 2-(isopropylamino)ethanol, 2-(methylamino)ethanol, 2-(diethylamino)ethanol, 2-(2-(dimethylamino)ethoxy)ethanol, 1,1'-[[3-(dimethylamino)propyl]imino]-bis-2-propanol, 2-(butylamino)ethanol, 2-(tert-butylamino)ethanol, 2-(diisopropylamino)ethanol, N-(3-aminopropyl)morpholine, and mixtures thereof.

The amine-containing compound can be present in the polishing systems in any suitable concentration, desirably such that the total ion concentration of the polishing system is above the critical coagulation concentration. Preferably, the amine-containing compound is present in the polishing system in a concentration of about 0.2 M or more (e.g., about 0.5 M or more). More preferably, the amine-containing compound is present in the polishing system in a concentration of about 0.7 M or more, about 0.8 M or more, about 0.9 M or more, or even about 1 M or more. It is also suitable for the amine-containing compound to be present in the polishing system in a concentration of about 1.1 M or more (e.g., about 1.5 M or more). Generally, the amine-containing compound is present in the polishing system in a concentration that does not exceed 3 M, preferably in an amount that does not exceed 1.4 M (e.g., about 0.2–1.4 M, or more preferably, about 0.7–1.1 M).

In a first embodiment, the polishing system contains both an alkali metal ion and a compound comprising an amine group and at least one polar moiety, wherein the polar moiety contains at least one oxygen atom, wherein the total ion concentration of the polishing system is above the critical coagulation concentration. The combination of the alkali metal ion and the amine-containing compound has a synergistic effect on the polishing rate achieved by the polishing system when the total ion concentration of the system is above the critical coagulation concentration.

The critical coagulation concentration (CCC) is defined herein as the lowest total ion concentration of the polishing system required to induce the coagulation of a stable colloidal suspension (e.g., to form a gel). In the context of the invention, coagulation can be described as the process by which the dispersed phase of a colloid (e.g., a slurry) is made to aggregate and thereby separate from the continuous phase, eventually forming a gel. This occurs when the ions present in the polishing system gather closely around the colloidal particles, effectively neutralizing the overall charge of the individual particles. Once this occurs, the particles can move closer together and eventually aggregate. Thus, the CCC is a function of the colloidal particle size as well as a function of the valences of the ions present in the polishing system. The stronger the counterion, the more tightly packed the colloidal particles will become, and thus the more likely the particles will agglomerate.

Since the CCC is related to the total ion concentration present in the polishing system, it varies both with the specific alkali metal ion and the specific amine-containing compound used in the polishing system. For example, a concentration of about 0.15 M or more of the alkali metal ion and a concentration of about 0.2 M or more of the amine-containing compound generally are sufficient to raise the total ion concentration of the polishing system above the CCC.

The CCC can be determined by any suitable method, many of which are known in the art and can be readily employed. One such method, for example, involves the Schulze-Hardy rule, which states that the CCC of counterions is found to be inversely proportional to the sixth power of its valence. Other suitable methods for calculating the CCC, including the Schulze-Hardy rule, are set forth, for example, in Hsu and Kuo, *J. Colloid Interface Sci.*, 185, 530–537 (1997).

Although the polishing system of the first embodiment desirably utilizes a total ion concentration well above the CCC, no agglomeration or sedimentation effects will be observed in the polishing system as used in the polishing method of the invention because the mixing of the components takes place at or near the time of use (i.e., polishing). In effect, this invention allows for higher concentrations of all components to be present in the polishing system without adverse gelling consequences. As a result, superior polishing rates can be achieved as compared to similar conventional CMP slurries.

In a second embodiment, the alkali metal ion is KOH that is present in the final polishing system (after mixing) in a concentration of about 0.05 wt. % to about 0.15 wt. % (e.g., about 0.08 wt. % to about 0.12 wt. %) and the amine-containing compound is present in the final polishing system (after mixing) in a concentration of about 0.4 M to about 0.8 M (e.g., about 0.5 M to about 0.7 M).

The polishing systems optionally further comprise ammonium salts (e.g., tetramethylammonium hydroxide (TMAH) and quaternary ammonium compounds). The ammonium salt can be any suitable cationic amine-containing compound, such as, for example, hydrogenated amines and quaternary ammonium compounds, that adsorbs to the silicon nitride layer present on the substrate being polished and reduces, substantially reduces, or even inhibits (i.e., blocks) the removal of silicon nitride during polishing. A preferred polishing system comprises a 1:1 equal weight ratio mixture of dimethylpropanolamine and tetramethylammonium hydroxide.

The polishing systems can have any pH that provides suitable polishing rates. Generally, the pH of the polishing system is about 7 or more (e.g., about 8 or more). Preferably, the pH of the present polishing system is about 9 or more (e.g., about 9–14). More preferably, the pH of the polishing system will be in the range of about 10–13 or even about 10–12. Because the inventive method disclosed herein provides for use of the polishing system at about 6 hours after mixing or less and preferably at the point-of-use, a higher pH can be used than would otherwise be possible for polishing systems that are allowed to reach chemical equilibrium, which systems must be stable upon storage for extended periods such as days, weeks, or months before use. The present polishing system is largely free of this constraint, requiring only that it be stable enough to provide suitable polishing in about 6 hours or less after it is prepared.

At its simplest, the polishing system consists essentially of a liquid carrier, an alkali metal ion, a compound containing an amine group and at least one polar moiety, wherein the polar moiety contains at least one oxygen atom, and a polishing pad and/or an abrasive. In this polishing system, the total ion concentration desirably is above the critical coagulation concentration. As mentioned previously, the liquid carrier is preferably a polar solvent, particularly water.

A variety of other additives can be used in conjunction with the polishing systems. For example, film-forming agents, complexing agents, surfactants, rheological control agents, polymeric stabilizers or dispersing agents, and/or halide ions can be present in the polishing system.

Any suitable film-forming agent (i.e., corrosion-inhibitor) can be used in conjunction with the polishing systems. For example, in STI polishing methods, suitable film-forming, agents generally include surface-active agents (i.e., surfactants) that preferentially adsorb to and prevent polishing of silicon nitride. Therefore, suitable film-forming agents include, for example, alkylamines, alkanolamines, hydroxylamines, phosphate esters, sodium laurylsulfate, fatty acids, polyacrylates, polymethacrylates, polyvinylphosphonates, polymalate, polystyrenesulfonate, and polyvinylsulfonate. Other film-forming agents include, for example, benzotriazole, triazole, benzimidazole, and mixtures thereof.

Any suitable complexing agent (i.e., chelating agent or selectivity enhancer) can be used in conjunction with the polishing systems. Suitable complexing agents include, for example, carbonyl compounds (e.g., acetylacetonates and the like), simple carboxylates (e.g., acetates, aryl carboxylates, and the like), carboxylates containing one or more hydroxyl groups (e.g., glycolates, lactates, gluconates, gallic acid and salts thereof, and the like), di-, tri-, and poly-carboxylates (e.g., oxalates, phthalates, citrates, succinates, tartrates, malates, edetates (e.g., disodium EDTA), mixtures thereof, and the like), and carboxylates containing one or more sulfonic and/or phosphonic groups. Suitable chelating or complexing agents also can include, for example, di-, tri-, or poly-alcohols (e.g., ethylene glycol, pyrocatechol, pyrogallol, tannic acid, and the like) and phosphate-containing compounds (e.g., phosphonium salts and phosphonic acids).

Any suitable surfactant and/or rheological control agent can be used in conjunction with the polishing systems, including viscosity enhancing agents and coagulants. Suitable rheological control agents include polymeric rheological control agents, such as, for example, urethane polymers (e.g., urethane polymers with a molecular weight greater than about 100,000 Daltons), acrylates comprising one or more acrylic subunits (e.g., vinyl acrylates and styrene acrylates), and polymers, copolymers, and oligomers thereof, and salts thereof Preferably, the rheological control agent is a low molecular weight carboxylate base or a high molecular weight polyacrylamide agent. Suitable surfactants include, for example, cationic surfactants, anionic surfactants, anionic polyelectrolytes, nonionic surfactants, amphoteric surfactants, fluorinated surfactants, mixtures thereof, and the like.

The polishing systems can contain any suitable polymeric stabilizer or other surface-active dispersing agent. Suitable stabilizers include, for example, phosphoric acid, organic acids, tin oxides, organic phosphonates, mixtures thereof, and the like.

The compounds recited herein have been classified for illustrative purposes, and there is no intent to limit the uses of these compounds to their noted classifications. As those of skill in the art will recognize, certain compounds may perform differently in different contexts and/or perform more than one function. For example, some compounds can function both as a chelating agent and an oxidizing agent (e.g., certain ferric nitrates and the like).

Any of the components used in conjunction with the invention can be provided in the form of a mixture or solution in an appropriate carrier liquid or solvent (e.g., water or an appropriate organic solvent). Furthermore, the compounds, alone or in any combination, can be used as components of the polishing system. Two or more components then desirably are individually stored and subsequently mixed to form the polishing system. In this regard, it is suitable for the polishing system to be prepared (e.g., for all the components to be mixed together) no more than 6 hours prior to delivery to the polishing pad or to the surface of the substrate. It is also suitable for the polishing system to be prepared on the surface of the polishing pad or on the surface of the substrate, through delivery of the components of the polishing system from two or more distinct sources, whereby the components of the polishing system meet at the surface of the polishing pad or at the surface of the substrate (e.g., at the point-of-use). In either case, the flow rate at which the components of the polishing system are delivered to the polishing pad or to the surface of the substrate (i.e., the delivered amount of the particular components of the polishing system) can be altered prior to the polishing process and/or during the polishing process, such that the polishing characteristics, such as rate, selectivity, and/or viscosity of the polishing system is altered.

When two or more of the components are combined prior to reaching the point-of-use, the components can be combined in the flow line and delivered to the point-of-use without the use of a mixing device. Alternatively, one or more of the flow lines can lead into a mixing device to facilitate the combination of two or more of the components. Any suitable mixing device can be used. For example, the mixing device can be a nozzle or jet (e.g., a high pressure nozzle or jet) or an in-line mixer through which two or more of the components flow. Alternatively, the mixing device can be a container-type mixing device comprising one or more inlets by which two or more components of the polishing slurry are introduced to the mixer, and at least one outlet through which the mixed components exit the mixer to be delivered to the point-of-use, either directly or via other elements of the apparatus (e.g., via one or more flow lines). Furthermore, the mixing device can comprise more than one chamber, each chamber having at least one inlet and at least one outlet, wherein two or more components are combined in each chamber. If a container-type mixing device is used, the mixing device preferably comprises a mixing mechanism to further facilitate the combination of the components. Mixing mechanisms are generally known in the art and include stirrers, blenders, agitators, paddled baffles, gas sparger systems, vibrators, etc.

A component can have any pH appropriate in view of the storage and contemplated end-use, as will be appreciated by those of skill in the art. Moreover, the pH of a component used in conjunction with the invention can be adjusted in any suitable manner, e.g., by adding a pH adjuster, regulator, or buffer. Suitable pH adjusters, regulators, or buffers include acids, such as, for example, inorganic acids (e.g., hydrochloric acid, nitric acid, sulfuric acid, phosphoric acid) and organic acids (e.g., acetic acid, citric acid, malonic acid, succinic acid, tartaric acid, and oxalic acid). Suitable pH adjusters, regulators, or buffers also include bases, such as, for example, inorganic hydroxide bases (e.g., sodium hydroxide, potassium hydroxide, ammonium hydroxide, cesium hydroxide, and the like) and carbonate bases (e.g., sodium carbonate and the like).

A substrate can be polished (e.g., planarized) by contacting the surface of the substrate with the polishing systems using any suitable technique. For example, in one typical CMP process, a wafer is pressed against a polishing pad using the inventive polishing system under controlled chemical, pressure, velocity, and temperature conditions and the pad and the wafer are moved with respect to each other. Material is then removed from the surface of the wafer.

A substrate can be polished with the polishing systems with any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, and coformed products thereof, and mixtures thereof. As discussed above, the abrasive of the polishing system can be fixed (e.g., embedded) in whole or in part, in or on the polishing pad. Such fixation on the polishing pad can be accomplished, for example, by blending the abrasive into the aforementioned polymers during the formation of the polishing pad or by adhering the abrasive to the pad after the pad is formed using such adherents as are known.

The polishing systems are particularly well suited for polishing a substrate that has undergone shallow trench isolation (STI) processing. STI processing typically involves providing a silicon substrate on which is deposited a layer of silicon dioxide and a layer of silicon nitride. Trenches are etched following photolithography and are filled with silicon dioxide. The excess silicon dioxide is planarized until the silicon nitride is fully exposed, such that the silicon oxide remaining in the trenches is approximately level with the silicon nitride level on the mesa regions or with the pad oxide level. Desirably, the polishing is carried out in such typical STI processing with the polishing systems and/or methods of the invention, preferably such that the silicon dioxide is removed and planarization stops at the silicon nitride layer.

Preferred formulations of the polishing systems can provide selective polishing of silicon oxide surfaces relative to silicon nitride surfaces. The selectivity can be controlled, to some extent, by altering the relative concentrations of the components of the polishing system. Without wishing to be bound by any particular theory, it is believed that cationic species (i.e., amines, such as hydrogenated amines, and quaternary ammonium compounds) adsorb to the silicon nitride layer and reduce, substantially reduce, or even inhibit (i.e., block) the removal of silicon nitride during polishing. The alkali metal ion of the polishing system neutralizes the cationic amine, thereby reducing its ability to adsorb to, and inhibit the removal of, the silicon nitride layer. Accordingly, silicon nitride removal by the polishing system can be controlled by altering the relative concentrations of the alkali metal ion and the amine-containing compound in the polishing system, as well as by altering the pH of the polishing system.

When desirable, the polishing systems and methods of the invention can be used to polish a substrate with a polishing selectivity of silicon oxide to silicon nitride (i.e., oxide:nitride) of about 2:1 or more (e.g., about 5:1 or more), or even an oxide:nitride selectivity of about 10:1 or more (e.g., about 15:1 or more). Certain formulations can exhibit even higher oxide:nitride selectivities, such as about 25:1 or more, or even about 35:1 or more (e.g., about 45:1 or more), and when very high selectivity is required even about 55:1 or more, about 65:1 or more, or even about 75:1 or more (e.g., about 90:1 or more).

The polishing methods desirably utilize at least one dispenser, which simultaneously or sequentially dispenses one or more components of a polishing system from the flow lines onto the polishing surface (e.g., the substrate surface or the polishing pad). A single dispenser can be used, from which a single component or any combination of components of the polishing system can be dispensed. Alternatively, the polishing methods can utilize more than one dispenser from which the components of the polishing system are independently dispensed (e.g., one dispenser for each component). Generally, however, the polishing methods utilize more than one dispenser from each of which different combinations or ratios of components can be dispensed. For example, two or more dispensers can be utilized, each delivering different components simultaneously or sequentially to the same polishing surface.

Following polishing of a composite substrate, the used polishing system can be combined with any compound(s) suitable for enhancing the disposability of the polishing system. Suitable compounds include, for example, acids which will decrease the pH of the used polishing system, calcium-containing salts which will act as complexing agents to fluoride ions, and other compounds known to ordinary artisans. These compounds can be added to the polishing system in any suitable manner. It is suitable, for example, for the compound to be added to the waste stream by which the polishing system exits the polishing surface.

EXAMPLES

The following examples further illustrate the invention but, of course, should not be construed as in any way limiting its scope.

Each of the polishing systems used in these examples was formulated as a two-component polishing system, wherein each component was present in a 1:1 ratio (by volume). The first component (hereinafter the "abrasive component") was the same for each polishing system and comprised about 20 wt. % fumed silica having a mean particle size of 25–35 nm, 0.007 wt. % HCl, and 0.2 wt. % KOH in water. The second component (hereinafter the "chemical component") was an aqueous chemical solution, which varied according to each polishing system.

Example 1

Each polishing system was used to polish semiconductor substrates by supplying the two-component polishing system to the polishing platen using each of two different methods. According to the first method (hereinafter referred to as "pre-use mixing"), the polishing system was supplied to the polishing platen to polish a semiconductor substrate 24 hours after combining the first and second components of the polishing system. According to the second method (hereinafter referred to as "point-of-use mixing"), the components of the polishing system separately were supplied to the polishing platen, where the components were mixed and the polishing system immediately was used to polish a semiconductor substrate.

The semiconductor substrate used in this example was a commercially available CMP characterization test wafer comprising a silica dielectric layer (designated the SKW7 pattern wafer by SKW Associates, Inc.). The semiconductor wafers were polished on an IPEC 472 polishing machine using a down-force of about 52 kpa (7.5 psi), back-pressure of about 20 kPa (3 psi), platen speed of 37 rpm, and carrier speed of 24 rpm. Test wafer removal rates were determined by directly measuring the thickness of each test wafer before and after polishing at the 70% stack site on each wafer using standard methods.

This example illustrates the significance of using a chemical component comprising an alkali metal ion and an amine-containing compound (i.e., a compound comprising an amine group and at least one polar moiety, wherein the polar moiety contains at least one oxygen atom) in conjunction with the polishing system and method of the invention.

Polishing systems 1A–1D were prepared by combining the abrasive component and a chemical component as indicated in Table 1 below, and were used to polish semiconductor substrates in conjunction with pre-use and point-of-use mixing as previously described. Table 1 below provides the resulting amine concentration and pH of the polishing systems, as well as the polishing rates achieved using each polishing system.

TABLE 1

| Polishing System | Chemical Component | Amine Concentration On Platen [M] | pH | Pattern Wafer Removal Rate (Å/min) Pre-use Mixing | Pattern Wafer Removal Rate (Å/min) Point-of-Use Mixing | Increase in Removal Rate Using Point-of-Use Mixing Over Pre-Use Mixing |
|---|---|---|---|---|---|---|
| 1A (comparative) | 1.8 wt % KCl | 0.0 | 9.7 | 2810 | 2859 | 2% |
| 1B (comparative) | 0.9 wt. % KCl | 0.0 | 10.0 | 3347 | 3279 | -2% |
| 1C (comparative) | 1.3 wt. % KCl + 0.3 wt. % KOH | 0.0 | 10.9 | 3762 | 3894 | 4% |
| 1D (invention) | 1.7 wt. % KCl + 4.0 wt. % DMAMP | 0.2 | 11.2 | 3766 | 4140 | 10% |

As indicated by the results set forth in Table 1 above, a polishing system containing an alkali metal ion and an amine-containing compound (as illustrated by polishing system 1D) provided a higher polishing rate than polishing systems comprising an alkali metal ion alone (i.e., without an amine-containing compound) (as illustrated by comparative polishing systems 1A–1C). These results also show that point-of-use mixing can significantly increase the polishing rate achieved by the polishing system as compared to pre-use mixing and that this polishing rate improvement is most significant for a polishing system comprising both an alkali metal ion and an amine-containing compound as compared to comparable polishing systems comprising only an alkali metal ion. Accordingly, this example demonstrates the benefits of using the polishing system and method of the invention to polish a substrate.

Example 2

Each polishing system was used to polish semiconductor substrates by supplying the two-component polishing system to the polishing platen by a method referred to as "point-of-use mixing" in which the components of the polishing system separately were supplied to the polishing platen, where the components were mixed and the polishing system immediately was used to polish a semiconductor substrate.

The semiconductor substrate used in this example was a commercially available CMP characterization test wafer comprising a silica dielectric layer (designated the SKW7 pattern wafer by SKW Associates, Inc.). The semiconductor wafers were polished on an IPEC 472 polishing machine using a down-force of about 28 kPa (4 psi), back-pressure of about 11 kPa (1.6 psi), platen speed of 60 rpm, and carrier speed of 56 rpm. Test wafer removal rates were determined by directly measuring the thickness of each test blanket wafer before and after polishing using standard methods.

This example illustrates the significance of using a chemical component comprising an alkali metal ion and an amine-containing compound (i.e., a compound comprising an amine group and at least one polar moiety, wherein the polar moiety contains at least one oxygen atom) in conjunction with the polishing system and method of the invention.

Polishing systems 2A–2D were prepared by combining the abrasive component and a chemical component as indicated in Table 2 below, and were used to polish semiconductor substrates. Table 2 below provides the resulting polishing rates and oxide to nitride selectivity using each polishing system.

TABLE 2

| Polishing System | Chemical Component | Oxide Removal Rate (Å/min) | Nitride Removal Rate (Å/min) | Oxide to Nitride Selectivity |
|---|---|---|---|---|
| 2A (invention) | 12 wt. % DMAMP 0.25 wt. % KOH | 1547 | 46 | 33 |
| 2B (invention) | 12 wt. % 2-(isopropylamino)-ethanol 0.25 wt. % KOH | 2063 | 74 | 28 |
| 2C (invention) | 12 wt. % 2-(butylamino)-ethanol 0.25 wt. % KOH | 1801 | 45 | 40 |
| 2D (comparative) | None | 2000 | 500 | 4 |

As indicated by the results set forth in Table 2 above, a polishing system containing an alkali metal ion and an amine-containing compound provided both a high polishing rate and good oxide to nitride selectivity (as illustrated by polishing systems 2A–2C) compared to the abrasive component alone (as illustrated by comparative polishing system 2D).

Example 3

Each polishing system was used to polish semiconductor substrates by supplying the two-component polishing system to the polishing platen by a method referred to as "point-of-use mixing" in which the components of the polishing system separately were supplied to the polishing platen, where the components were mixed and the polishing system immediately was used to polish a semiconductor substrate.

The semiconductor substrate used in this example was a commercially available CMP characterization test blanket wafer. The semiconductor wafers were polished on an IPEC 472 polishing machine using a down-force of about 28 kPa (4 psi), back-pressure of about 11 kPa (1.6 psi), platen speed of 60 rpm, and carrier speed of 56 rpm. Test wafer removal rates were determined by directly measuring the thickness of each test wafer before and after polishing using standard methods.

This example illustrates that the oxide to nitride selectivity can be optimized through careful control of the relative amount of alkali metal ion.

Polishing systems 3A–3L were prepared by combining the abrasive component and a chemical component as indicated in Table 3 below, and were used to polish semiconductor substrates. Table 3 below provides the resulting polishing rates and oxide to nitride selectivity using each polishing system.

TABLE 3

| Polishing System | Chemical Component | Oxide Removal Rate (Å/min) | Nitride Removal Rate (Å/min) | Oxide to Nitride Selectivity |
|---|---|---|---|---|
| 3A (invention) | 12 wt. % DMAMP 0.1 wt. % KOH | 512 | 18 | 29 |
| 3B (invention) | 12 wt. % DMAMP 0.2 wt. % KOH | 1556 | 46 | 34 |
| 3C (invention) | 12 wt. % DMAMP 0.3 wt. % KOH | 2157 | 14 | 19 |
| 3D (invention) | 12 wt. % 2-(isopropylamino)ethanol 0.1 wt. % KOH | 122 | 31 | 36 |
| 3E (invention) | 12 wt. % 2-(isopropylamino)ethanol 0.2 wt. % KOH | 2152 | 22 | 18 |
| 3F (invention) | 12 wt. % 2-(isopropylamino)ethanol 0.3 wt. % KOH | 2486 | 255 | 10 |
| 3G (invention) | 12 wt. % 2-(butylamino)ethanol 0.1 wt. % KOH | 1239 | 26 | 49 |
| 3H (invention) | 12 wt. % 2-(butylamino)ethanol 0.2 wt. % KOH | 2182 | 57 | 38 |
| 3I (invention) | 2 wt. % 2-(butylamino)ethanol 0.3 wt. % KOH | 2402 | 123 | 20 |
| 3J (invention) | 12 wt. % aminopropylmorpholine 0.3 wt. % KOH | 571 | 27 | 21 |
| 3K (invention) | 12 wt. % aminopropylmorpholine 0.2 wt. % KOH | 2085 | 103 | 20 |
| 3L (invention) | 12 wt. % aminopropylmorpholine 0.3 wt. % KOH | 286 | 262 | 11 |

As indicated by the results set forth in Table 3 above, increasing the amount of KOH in the polishing system increases the overall removal rates of both the oxide and nitride layers; however, the rate increase is accompanied by a decrease in the oxide to nitride selectivity.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of polishing a substrate comprising contacting a surface of a substrate with a polishing system comprising
    (a) a polishing composition comprising
        (i) a liquid carrier,
        (ii) an alkali metal ion, and
        (iii) a compound comprising an amine group and at least one polar moiety, wherein the polar moiety contains at least one oxygen atom, and
    (b) a polishing pad and/or an abrasive, and polishing at least a portion of the substrate therewith, wherein the total ion concentration of the polishing composition is above the critical coagulation concentration.

2. The polishing method of claim 1, wherein the liquid carrier is a polar solvent.

3. The polishing method of claim 2, wherein the liquid carrier is water.

4. The polishing method of claim 3, wherein the polishing system comprises an abrasive suspended in the liquid carrier.

5. The polishing method of claim 3, wherein the polishing system comprises a polishing pad and an abrasive, and the abrasive is fixed in or on the polishing pad.

6. The method of claim 1, wherein the polishing system further comprises a rheological control agent.

7. The method of claim 6, wherein the rheological control agent is a carboxylate base.

8. The method of claim 6, wherein the rheological control agent is a polyacrylamide agent.

9. The method of claim 1, wherein the substrate is polished after having undergone a shallow trench isolation process.

10. The polishing method of claim 3, wherein the abrasive is a metal oxide.

11. The polishing method of claim 10, wherein the abrasive is silica.

12. The polishing method of claim 11, wherein the abrasive is fumed silica.

13. The polishing method of claim 3, wherein the alkali metal ion has a concentration of about 0.1 M or more.

14. The polishing method of claim 13, wherein the alkali metal ion has a concentration of about 0.2 M or more.

15. The polishing method of claim 14, wherein the alkali metal ion has a concentration of about 0.3 M or more.

16. The polishing method of claim 3, wherein the alkali metal ion is potassium.

17. The polishing method of claim 3, wherein the alkali metal ion is cesium.

18. The polishing method of claim 3, wherein the compound comprising an amine group and at least one polar moiety, wherein the polar moiety contains at least one oxygen atom, is 2-dimethylamino-2-methyl-1-propanol, 2-amino-2-methyl-1-propanol, or a mixture thereof.

19. The polishing method of claim 3, wherein the compound comprising an amine group and at least one polar moiety, wherein the polar moiety contains at least one oxygen atom, is 2-(2-aminoethylamino)ethanol, 2-(isopropylamino)ethanol, 2-(methylamino)ethanol, 2-(diethylamino)ethanol, 2-(2-(dimethylamino)ethoxy) ethanol, 1,1'-[[3-(dimethylamino)propyl]imino ]-bis-2-propanol, 2-(butylamino)ethanol, 2-(tert-butylamino) ethanol, 2-(diisopropylamino)ethanol, N-(3-aminopropyl) morpholine, or a mixture thereof.

20. The polishing method of claim 18, wherein the compound comprising an amine group and at least one polar moiety, wherein the polar moiety contains at least one oxygen atom, is 2-dimethylamino-2-methyl-1-propanol, and the polishing system further comprises an equal weight amount of tetramethylammonium hydroxide.

21. The polishing method of claim 3, wherein the pH of the polishing system is about 9 or more.

22. The polishing method of claim 21, wherein the pH of the polishing system is about 10 or more.

23. The polishing method of claim 22, wherein the pH of the polishing system is about 11 or more.

24. The polishing method of claim 23, wherein the pH of the polishing system is about 12 or more.

25. The method of claim 1, wherein the surface of the substrate is contacted with the polishing system in about 1 hour or less after the polishing composition is prepared.

26. The method of claim 25, wherein the surface of the substrate is contacted with the polishing system in about 30 minutes or less after the polishing composition is prepared.

27. The method of claim 26, wherein the surface of the substrate is contacted with the polishing system in about 10 minutes or less after the polishing composition is prepared.

28. The method of claim 27, wherein the polishing composition is prepared at its point-of-use.

29. The method of claim 1, wherein the substrate comprises Si atoms.

30. The method of claim 1, wherein the substrate comprises Si, $SiO_2$, $Si_3N_4$, SiON, polysilicon, or a combination thereof.

31. A polishing system for polishing a substrate comprising
(a) a polishing composition comprising
  (i) a liquid carrier,
  (ii) an alkali metal ion, and
  (iii) a compound comprising an amine group and at least one polar moiety, wherein the polar moiety contains at least one oxygen atom, and
(b) a polishing pad and/or an abrasive, wherein the total ion concentration of the polishing composition is above the critical coagulation concentration.

32. The polishing system of claim 31, wherein the liquid carrier is water.

33. The polishing system of claim 32, wherein the alkali metal ion is present in the polishing composition in a concentration of about 0.15 M or more.

34. The polishing system of claim 33, wherein the amine containing compound is present in the composition in a concentration of about 0.2 M or more.

35. The polishing system of claim 32, wherein the polishing system comprises an abrasive suspended in the liquid carrier.

36. The polishing system of claim 35, wherein the abrasive is silica.

37. The polishing system of claim 36, wherein the abrasive is fumed silica.

38. The polishing system of claim 37, wherein the abrasive has a surface are of about 90 $m^2/g$ or more.

39. The polishing system of claim 32, wherein the polishing system further comprises an acid and/or a base.

40. The polishing system of claim 32, wherein the polishing system further comprises a rheological control agent.

41. The polishing system of claim 40, wherein the rheological control agent is a carboxylate base.

42. The polishing system of claim 40, wherein the rheological control agent is a polyacrylamide agent.

43. The polishing system of claim 32, wherein the alkali metal ion is selected from the group consisting of potassium, cesium, and combinations thereof.

44. The polishing system of claim 32, wherein the compound comprising an amine group and at least one polar moiety, wherein the polar moiety contains at least one oxygen atom is 2-dimethylamino-2-methyl-1-propanol, 2-amino-2-methyl-1-propanol, or a mixture thereof.

45. The polishing system of claim 32, wherein the pH of the polishing system is about 9 or more.

46. A polishing system for polishing a substrate consisting essentially of
(a) a polishing composition comprising
  (i) a liquid carrier,
  (ii) an alkali metal ion, and
  (iii) a compound comprising an amine group and at least one polar moiety, wherein the polar moiety contains at least one oxygen atom, and
(b) a polishing pad and/or an abrasive, wherein the total ion concentration of the polishing composition is above the critical coagulation concentration.

47. A polishing system for polishing a substrate comprising:
(a) a polishing composition comprising
  (i) a liquid carrier,
  (ii) about 0.05 wt. % to about 0.15 wt. % KOH, and
  (iii) about 0.4 M to about 0.8 M of a compound comprising an amine group and at least one polar moiety, wherein the polar moiety contains at least one oxygen atom, and
(b) a polishing pad and/or an abrasive.

48. The polishing system of claim 47, wherein the compound comprising an amine group and at least one polar moiety, wherein the polar moiety contains at least one oxygen atom, is 2-dimethylamino-2-methyl-1-propanol, 2-(isopropylamino)ethanol, 2-(butylamino)ethanol, or N-(3-aminopropyl)morpholine.

* * * * *

UNITED STATES PATENT AND TRADEMARK OFFICE
CERTIFICATE OF CORRECTION

PATENT NO.    : 6,612,911 B2                                      Page 1 of 1
DATED         : September 2, 2003
INVENTOR(S)   : Phillip Carter et al.

It is certified that error appears in the above-identified patent and that said Letters Patent is hereby corrected as shown below:

<u>Title page,</u>
Item [57], ABSTRACT, the phrase "with a the aforementioned" should read -- with the aforementioned --.

<u>Column 2,</u>
Line 7, the terms "and method These" should read -- and method. These --.
Line 45, the terms "to about 0. 5" should read -- to about 0.15 --.

<u>Column 4,</u>
Line 44, the terms "(e.g., KCI" should read -- (e.g., KC1 --.

<u>Column 6,</u>
Line 66, the phrase "film-forming, agent" should read -- film-forming agent --.

<u>Column 13,</u>
Line 18, the term "14" should read -- 114 --.
Line 20, the term "122" should read -- 1122 --.
Line 23, the term "22" should read -- 122 --.

Signed and Sealed this

Fourteenth Day of October, 2003

JAMES E. ROGAN
*Director of the United States Patent and Trademark Office*